US012091903B2

(12) United States Patent
Parsadayan et al.

(10) Patent No.: US 12,091,903 B2
(45) Date of Patent: Sep. 17, 2024

(54) DEVICES AND METHODS FOR COORDINATED GATE MOVEMENT

(71) Applicants: Andrew Parsadayan, Newport Coast, CA (US); Peter Parsadayan, Newport Coast, CA (US); Walter Parsadayan, Newport Coast, CA (US)

(72) Inventors: Andrew Parsadayan, Newport Coast, CA (US); Peter Parsadayan, Newport Coast, CA (US); Walter Parsadayan, Newport Coast, CA (US)

( * ) Notice: Subject to any disclaimer, the term of this patent is extended or adjusted under 35 U.S.C. 154(b) by 226 days.

(21) Appl. No.: 17/735,512

(22) Filed: May 3, 2022

(65) Prior Publication Data

US 2022/0356748 A1 Nov. 10, 2022

Related U.S. Application Data

(60) Provisional application No. 63/184,013, filed on May 4, 2021.

(51) Int. Cl.

*H02P 3/00* (2006.01)
*E05F 17/00* (2006.01)

(52) U.S. Cl.

CPC ............ *E05F 17/004* (2013.01); *E05F 17/00* (2013.01); *E05F 2017/008* (2013.01); *E05Y 2201/434* (2013.01); *E05Y 2400/415* (2013.01); *E05Y 2900/40* (2013.01)

(58) Field of Classification Search

CPC ... E05F 17/00; E05F 2017/008; E05F 15/611; E05Y 2900/40; E05Y 2400/32

See application file for complete search history.

(56) References Cited

U.S. PATENT DOCUMENTS

| | | | | |
|---|---|---|---|---|
| 4,429,264 | A * | 1/1984 | Richmond | E05F 15/63 49/340 |
| 5,347,755 | A * | 9/1994 | Jaster | E05F 1/046 49/118 |
| 5,869,940 | A | 2/1999 | Parsadayan | |
| 8,111,997 | B2 | 2/2012 | Butler | |
| 8,291,642 | B2 | 10/2012 | Jankovsky | |
| 2016/0253894 | A1* | 9/2016 | Pignolet | G08B 5/36 49/13 |

FOREIGN PATENT DOCUMENTS

| | | | |
|---|---|---|---|
| EP | 3725991 | A1 * | 10/2020 |
| WO | 2020077973 | A1 | 4/2020 |

* cited by examiner

*Primary Examiner* — Muhammad S Islam
(74) *Attorney, Agent, or Firm* — Martin Fessenmaier; Umberg Zipser LLP

(57) ABSTRACT

An access control system controls synchronous or coordinated motion of two or more gates using a controller that calculates travel time for each gate and that adjusts the speed of the motors driving the gates to so allow the gates to reach the open and/or closed position at the same time, regardless of the length of the individual travel paths of the gate.

16 Claims, No Drawings

DEVICES AND METHODS FOR COORDINATED GATE MOVEMENT

This application claims priority to our co-pending US Provisional Patent Application with the Ser. No. 63/184,013, which was filed May 4, 2021, and which is incorporated by reference herein.

FIELD OF THE INVENTION

The field of the invention is devices and methods of operating multiple gates, especially gates that control access to and from residential and commercial properties.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Movable gates or barriers to control or restrict access to residential or commercial properties are well known in the art and, depending on the particular location and need will move the gate or barrier in a horizontal or vertical motion, or swing or pivot a gate or barrier about a point of rotation. Still further known gates and barriers can be moved in a compound motion. Most commonly, the gate or barrier is moved by an operator that is controlled via a remote signal coming from a wireless transmitter or keypad.

To ascertain that the gate will move from an open position to a completely closed position, the operator may in some cases receive sensor signals or in other cases be simply controlled by a predetermined run time of the operator. Unfortunately, such mechanisms are often prone to failure and/or must be calibrated at the time of installation. To overcome at least some of these difficulties, a gate operator may be controlled by a system that includes a learning mode to ensure proper opening and closing of a single gate in a variety of installation environments as is described in U.S. Pat. No. 5,869,940. While such mechanism is advantageous for single gate panels, such mechanism will not ensure synchronous or coordinated movement of dual gates, and several approaches have been undertaken to enable synchronous or coordinated movement of dual gates.

For example, U.S. Pat. No. 8,291,642 describes operation of a dual gate system where multiple operating characteristics for different gates are taken into consideration to thereby allow for synchronizing and coordinating operation of multiple barriers, and where a controller receives positional information of the first gate in an intermediate position to influence movement of the second gate. In another example, as described in WO2020/077973, coordinated electronic trigger signals of gate panels are used to assist in synchronous movement of the gates. In still another example, positional angle sensor/encoders are used, and a controller uses continuous sensor signals to direct gate movement as is taught in EP 3,725,991. Here, tracking movement of the first gate in relation to its post and the second gate in relation to the first gate are used to help synchronize movement of two folding gates. In yet another example, U.S. Pat. No. 8,111,997 an encoded light beam is used to control gate movement of dual gate systems. Here, the synchronization is performed at discrete steps/stages of opening/closing the gate, requiring intermediate communication between the gates. While some of these systems allow a coordinated opening and/or closing, several drawbacks nevertheless exists. Among other things, operational complexity and/or the need for sensors and continuous communication will add points of failure and increase cost.

Thus, even though various systems and methods of synchronized and/or coordinated gates are known in the art, all or almost all of them suffer from several drawbacks. Therefore, there remains a need for compositions and methods for improved synchronized and/or coordinated gates.

SUMMARY OF THE INVENTION

The inventive subject matter is directed to various systems and methods of operating dual or multiple gates in which the time of travel for each gate is calculated and in which the speed of the respective motors is adjusted to reach the open and/or closed position for each gate at the same time. Where desired, contemplated systems may also use encoders to accurately determine the instantaneous position of a gate throughout the entire range of motion as the gate moves.

Viewed from a different perspective, the inventors contemplate that time-to-close can be used independently for each gate, possibly with an independently operated delay. Therefore, it should be noted that two or more gates can move at two different speeds or accelerations, which may be constant or differing along the path, while still achieving synchronized or coordinated motion. Consequently, two or more gates can open and close in a full cycle based only on one signal for the two or more gates to open or close.

In one aspect of the inventive subject matter, the inventors contemplate a method of operating a first and a second gate of an access control system that includes a step of providing a first gate having a first travel path between an open and a closed position, and a second gate having a second travel path between an open and a closed position. In such methods, the first gate is moved along the first travel path by a first motor and the second gate is moved along the second travel path by a second motor. In another step, respective times of travel between the respective open and closed positions are independently determined for the first and second gates, and in yet another step, a controller is used to determine and set respective speeds of the first and second motors such that the first and second gates open and/or close at the same time.

Therefore, the inventors also contemplate an access control system that include a first gate having a first travel path between an open and a closed position, and a second gate having a second travel path between an open and a closed position. Contemplates systems further include a first motor that is coupled to the first gate to thereby move the first gate along the first travel path, and a second motor that is coupled to the second gate to thereby move the second gate along the second travel path. A controller is then electronically coupled to the first and/or second motor, wherein the controller is programmed to independently determine for the first and second gates respective times of travel between the respective open and closed positions, and to determine and set for the first and second motors respective speeds such that the first and second gates open and/or close at the same time.

Viewed from a different perspective, the inventors also contemplate a controller for operating a first and a second gate of an access control system in which the first gate has a first travel path between an open and a closed position, and in which the second gate has a second travel path between an open and a closed position, wherein the first gate is moved along the first travel path by a first motor, and wherein the second gate is moved along the second travel path by a second motor. Such controller will typically include a control circuit that is electronically coupled to the first and/or second motor, and the controller independently (i) determines for the first and second gates respective times of travel between the respective open and closed positions, and (ii) determines and sets for the first and second motors respective speeds of the first and second motors such that the first and second gates open and/or close at the same time.

In some embodiments, the first and second gates are configured as swing gates, and/or the first and second travel paths have respective lengths that are not identical (e.g., the first travel path is at least 10% longer or shorter than the second travel path). It is generally preferred that the controller is configured as a single controller unit. Moreover, and where desired, a start and/or stop sensor may provide a start and/or stop signal to the controller, and/or an encoder (typically coupled to the first and/or second motors) provides a positional signal of the first and/or second gate to the controller.

In some embodiments, the respective times of travel are determined from operational times of the first and second motor alone, optionally in combination with motor speed, or from an encoder signal from the first and second motors. In further embodiments, the respective speeds of the first and second motors are determined based on the respective times of travel. Therefore, the first and second gates may move at different speeds and/or at different accelerations. Moreover, it should be appreciated that the first and second gates move independently of each other and only require a single command to open and/or close.

Various objects, features, aspects, and advantages of the inventive subject matter will become more apparent from the following detailed description of preferred embodiments, along with the accompanying drawing FIGURES in which like numerals represent like components.

DETAILED DESCRIPTION

The inventors have discovered systems and methods of operating access control gates in which the movement of the gate is coordinated or synchronized using the time of travel for each gate, and in which the speed of the respective motors driving the gates is adjusted to so reach the open and/or closed position for each gate at the same time synchronously. Such control mechanism advantageously allows independent, synchronous control over the motion of the gates, which in turn enables such systems to operate the gates in circumstances where the travel path of the individual gates is not identical or when the travel paths must not be achieved simultaneously, but with a synchronized offset. Moreover, and particularly where the travel path length of the gates is not identical, delays can be added to the motion of one or more gates. Viewed from a different perspective, the motion of two gates can be a coordinated movement such that the gates close at the same time or with an offset, even though the travel path length of each gate can be significantly different (e.g., by implementation of a delay in start of movement for one gate) or a synchronized movement such that the gates begin and end the closing motion at the same time or with an offset, synchronously, utilizing different speeds.

Synchronous operation of the gates as opposed to simultaneous operation, especially when closing with an offset, is particularly relevant when a magnetic or solenoid lock either requires one gate to finish closing some offset behind the other due to the asymmetry of a locking mechanism (e.g., in cases with a front locking piece on one gate and a back locking piece on the other), or when a latching mechanism (which can be unlocked by some separate actuation step) is first locked by the timed offset of the gates' closing. While the latter has been traditionally achieved by allowing the first gate to finish closing well in advance of the second gate, this precludes a (mechanical) locking mechanism that might rely on the well-timed gate closing with only some small offset (or simultaneously) where the locking mechanism begins engaging during the travel path, and not when one or both travel paths are completed.

For example, in a typical residential access control system having a dual swing gate arrangement where the gates pivot about respective axes to so open or close access into or egress out of a neighborhood, each gate has a gate operator that is mechanically coupled to the gate to so drive motion of the respective gate. A controller is electronically coupled to the gate operators to control operation of the electric motor in the operators. Upon receiving a signal to open or close the gates, the controller causes both motors to start and move both gates at respective speeds such that both gates will reach the open or closed position at the same time. In such example, the controller is programmed to determine the time of travel for each gate, and the controller will also determine and/or set respective speeds of the first and second motors such that the first and second gates open and/or close at the same time.

Of course, it should be appreciated that the access control system need not necessarily be limited to a residential access control system, but may also be an industrial access control system, or an access control system to help ascertain security in a civilian or military setting. Therefore, it should be noted that the gates may be swing gates, gates that move in horizontal direction only, and gates with a compound motion. In addition, it is generally preferred that the gates will be moved between the open and closed position in a relatively slow motion, such as between 2 and 10 seconds, or between 5 and 15 seconds, or between 10 and 20 seconds, or between 10 and 30 seconds, and in some cases even longer. Moreover, it is generally preferred that the gate operator will be operated using an electric motor, however, use of hydraulic actuators and/or combustion engines are not excluded. In most typical embodiments, the gates will be residential or industrial access gates that permit or prevent vehicular access on at least one traffic lane or two opposing traffic lanes.

As will be readily appreciated, the signal to open and/or close the gates can be provided in a variety of manners, including wireless signals, Bluetooth signals, WiFi signals, NFC signals, as well as signals provided from a device such as a magnetic card reader, RFID card reader, numeric control panel, face recognition module, and signals form such devices may be routed to the controller via conductive wires, optical signals, or wireless signals.

With respect to the gates, it should be recognized that in contrast to known gate systems the travel path of the two (or more) gates need not be the same. Among other things, differences in the length of the travel path may be due to a slope in the access path on one side, obstacles such as posts, plants or other landscaping items, or even immobile structure (e.g., residence, guard house, etc.) For example, the travel path of one gate may differ from the travel path of another gate by at least 2%, or at least 5%, or at least 10%, or at least 15%, or at least 20%, or at least 25, or even more. As will be readily appreciated, such difference may be due to differing angular path or differing longitudinal path. As will also be readily appreciated, such differences will result in non-coordinated and non-synchronous movement using heretofore known access control systems where start and stop sensors are used to control the motion of the gates. Consequently, such systems lack the ability to coordinate or synchronize motion of the gates such that the gates arrive at the closed position at the same time.

To circumvent such disadvantages, the inventors have now developed a controller that uses the time of travel to determine and/or sets respective speeds of the first and second motors such that the first and second gates open and/or close at the same time. Viewed from a different perspective, the controller is programmed such that the travel path for an individual gate at a specific speed of the motor will be traversed in a specific time.

For example, in one embodiment, the controller can be programmed for each operator such that the travel distance for each gate is determined or set. As will be readily appreciated, the travel distance can be determined or set in a variety of manners, including programming the controller using the number of revolutions of the drive motor required for the complete distance of the travel path. Alternatively, the travel distance can be manually inputted into the controller, or automatically determined using respective encoders for the individual drive motors. Upon determination of the travel path length for each gate, the drive motor speed (and with that the speed of motion of the respective gate) of each motor will then determine the time-to-open or time-to-close. Of course, once the travel path length is determined and a desired time-to-open or time-to-close is established, the controller can then calculate and set the appropriate speed for each drive motor.

Therefore, the controller will be able to set a suitable motor speed throughout the travel path even if a gate is delayed or ahead of its intended position, which may be due to wind and/or snow load, manual pushback on the gate, mild gate obstruction (e.g., snow or toy in the travel path, etc.), and so on. Moreover, it should be recognized that the controller may also upon the receipt of a signal to close or open a gate cause the first operator to move a first gate and provide a (typically predetermined) delay to the second operator of a second gate such that both gates will reach the same closed position at the same time while moving at the same speed. Alternatively, the controller may upon receipt of a signal cause both gates to start moving at the same time, albeit at different speeds such that both gates will reach the same closed position at the same time.

In still further contemplated embodiments, it should be appreciated that the gates need not necessarily move along the respective travel paths at a uniform speed, but that the speed can change over time as the gate moves along the travel party. Thus, a single gate may accelerate or slow down its movement to achieve the closing and/or opening at a specific time-to-open or time-to-close. Advantageously, contemplated systems and methods will therefore not require communication between the gates to coordinate or synchronize movement of the gates, and the control of the gates is thus significantly simplified. However, in still further contemplated aspects, the systems and methods presented herein may additionally include one or more sensors that provide one or more signals regarding operations status such as gate open, gate closed, gate position, gate moving, gate accelerating, etc. Such sensors may advantageously allow one gate to be keyed off of the status of the other gate.

As will be recognized, the controller may be configured such that a single controller will control movement of only one gate, or such that a single controller will control operation of two or more gates. Accordingly, each gate operator may have an individual controller (typically collocated), or two or more gate operators will have a common controller where the controller may be centrally located (e.g., within 200 feet of a gate operator), remotely located, or collocated with a single operator.

In some embodiments, the numbers expressing quantities of ingredients, properties such as concentration, reaction conditions, and so forth, used to describe and claim certain embodiments of the invention are to be understood as being modified in some instances by the term “about.” Accordingly, in some embodiments, the numerical parameters set forth in the written description and attached claims are approximations that can vary depending upon the desired properties sought to be obtained by a particular embodiment. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., “such as”) provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of “a,” “an,” and “the” includes plural reference unless the context clearly dictates otherwise. Also, as used in the description herein, the meaning of “in” includes “in” and “on” unless the context clearly dictates otherwise. As also used herein, and unless the context dictates otherwise, the term “coupled to” is intended to include both direct coupling (in which two elements that are coupled to each other contact each other) and indirect coupling (in which at least one additional element is located between the two elements). Therefore, the terms “coupled to” and “coupled with” are used synonymously. Moreover, the term “electronically coupled” includes direct and indirect coupling, either through a wired conductive path or a wireless (e.g., optical, electromagnetic, etc.) communication path.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A method of operating a first and a second gate of an access control system, comprising:

providing a first gate having a first travel path between an open and a closed position, and a second gate having a second travel path between an open and a closed position, wherein the first and second gate are distinct and separable movable gates from one another;

wherein the first gate is moved along the first travel path by a first motor and wherein the second gate is moved along the second travel path by a second motor;

independently determining for the first and second gates respective times of travel between the respective open and closed positions; and using a controller to determine and/or set respective speeds of each of the first and second motors based on the respective times of travel such that the first and second gates open and/or close in a coordinated or synchronous manner, wherein the first and second gates move at different speeds and/or at different accelerations.

2. The method of claim 1, wherein the first and second gates are configured as swing gates, wherein the first and second travel paths have respective lengths that are not identical, and wherein the first travel path is at least 10% longer or shorter than the second travel path.

3. The method of claim 1, further comprising a step of using a start and/or stop sensor that provides a start and/or stop signal to the controller.

4. The method of claim 1, further comprising a step of using an encoder coupled to the first and/or second motor that provides a positional signal of the first and/or second gate to the controller.

5. The method of claim 1, wherein the respective times of travel are determined from operational times of the first and second motor alone, optionally in combination with motor speed, or from an encoder signal from the first and second motors.

6. The method of claim 1, wherein the first and second gates move independently of each other and only require a single command to open and/or close.

7. An access control system, comprising:

a first gate having a first travel path between an open and a closed position, and a second gate having a second travel path between an open and a closed position, wherein the first and second gate are distinct and separable movable gates from one another;

a first motor coupled to the first gate to thereby move the first gate along the first travel path, and a second motor coupled to the second gate to thereby move the second gate along the second travel path; and a controller electronically coupled to the first and/or second motor, wherein the controller independently (i) for the first and second gates determines respective times of travel between the respective open and closed positions; and (ii) for the first and second motors determines and/or sets respective speeds of the first and second motors based on the respective times of travel such that the first and second gates open and/or close in a coordinated or synchronous manner;

wherein the controller is configured to move the first and second gates at different speeds and/or at different accelerations.

8. The access control system of claim 7, wherein the first and second gates are configured as swing gates, wherein the first and second travel paths have respective lengths that are not identical, and wherein the first travel path is at least 10% longer or shorter than the second travel path.

9. The access control system of claim 7, further comprising a start and/or stop sensor coupled to the controller to provide a start and/or stop signal.

10. The access control system of claim 7, further comprising an encoder coupled to the first and/or second motor to provides a positional signal of the first and/or second gate to the controller.

11. The access control system of claim 7, wherein the controller is configured to determine respective times of travel from operational times of the first and second motor alone, optionally in combination with motor speed, or from an encoder signal from the first and second motors.

12. The access control system of claim 7, wherein the controller is configured to move the first and second gates independently of each other via the first and second motors, and wherein the controller only require a single command to open and/or close the first and second gates.

13. A controller for operating a first and a second gate of an access control system in which the first gate has a first travel path between an open and a closed position, and in which the second gate has a second travel path between an open and a closed position, wherein the first gate is moved along the first travel path by a first motor, and wherein the second gate is moved along the second travel path by a second motor, wherein the first and second gate are distinct and separable movable gates from one another, the controller comprising:

a control circuit electronically coupled to the first and/or second motor, wherein the controller independently:

(i) for the first and second gates determines respective times of travel between the respective open and closed positions; and (ii) for the first and second motors determines and/or sets respective speeds of the first and second motors based on the respective times of travel such that the first and second gates open and/or close in a coordinated or synchronous manner;

wherein the controller is configured to move the first and second gates at different speeds and/or at different accelerations.

14. The controller of claim 13 further comprising a step of using a start and/or stop sensor that provides a start and/or stop signal to the controller.

15. The controller of claim 13 further comprising a step of using an encoder coupled to the first and/or second motor that provides a positional signal of the first and/or second gate to the controller.

16. The controller of claim 13 wherein the respective times of travel are determined from operational times of the first and second motor alone, optionally in combination with motor speed, or from an encoder signal from the first and second motors.

* * * * *